(12) United States Patent
White

(10) Patent No.: US 7,587,037 B2
(45) Date of Patent: Sep. 8, 2009

(54) NETWORK CONFERENCING USING METHOD FOR DISTRIBUTED COMPUTING AND/OR DISTRIBUTED OBJECTS FOR PRESENTATION TO A MOBILE COMMUNICATIONS DEVICE

(75) Inventor: Wesley White, Kennesaw, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 940 days.

(21) Appl. No.: 10/854,324

(22) Filed: May 26, 2004

(65) Prior Publication Data
US 2005/0265534 A1 Dec. 1, 2005

(51) Int. Cl.
*H04M 3/42* (2006.01)
*G06F 15/16* (2006.01)

(52) U.S. Cl. ............................. 379/202.01; 709/204

(58) Field of Classification Search ............ 379/202.01; 709/230, 204, 205; 455/566; 370/469
See application file for complete search history.

(56) References Cited

U.S. PATENT DOCUMENTS

| | | | |
|---|---|---|---|
| 4,736,407 A | 4/1988 | Dumas | |
| 4,796,293 A | 1/1989 | Blinken et al. | |
| 5,365,577 A | 11/1994 | Davis et al. | |
| 5,530,472 A | 6/1996 | Bregman et al. | |
| 5,537,548 A | 7/1996 | Fin | |
| 5,659,692 A | 8/1997 | Poggio | |
| 5,701,301 A | 12/1997 | Weisser, Jr. | |
| 5,784,561 A | 7/1998 | Bruno et al. | |
| 5,822,525 A | 10/1998 | Tafoya | |
| 5,838,774 A | 11/1998 | Weisser, Jr. | |
| 5,844,979 A | 12/1998 | Raniere et al. | |
| 5,854,893 A | 12/1998 | Ludwig | |
| 5,884,032 A | 3/1999 | Bateman et al. | |
| 5,978,463 A | 11/1999 | Jurkevics et al. | |
| 5,978,806 A | 11/1999 | Lund | |
| 5,995,608 A | 11/1999 | Detampel, Jr. et al. | |
| 5,999,966 A | 12/1999 | McDougall et al. | |
| 6,049,602 A | 4/2000 | Foladare et al. | |
| 6,061,440 A * | 5/2000 | Delaney et al. | 379/202.01 |
| 6,064,730 A | 5/2000 | Ginsberg | |
| 6,108,687 A | 8/2000 | Craig | |
| 6,148,068 A | 11/2000 | Lowery | |
| 6,181,786 B1 | 1/2001 | Detampel, Jr. et al. | |
| 6,233,605 B1 | 5/2001 | Watson | |
| 6,295,551 B1 | 9/2001 | Roberts et al. | |
| 6,446,113 B1 | 9/2002 | Ozzie | |
| 6,560,637 B1 | 5/2003 | Dunlap | |
| 6,654,785 B1 | 11/2003 | Craig | |

(Continued)

*Primary Examiner*—Ahmad F Matar
*Assistant Examiner*—Sonia Gay
(74) *Attorney, Agent, or Firm*—Scott P. Zimmerman PLLC

(57) ABSTRACT

Prior to a conference with a remote, mobile participant, a library of digital objects and a Mobile Conferencing Module is communicated to a memory device of a communications network. During the conference, the network-resident Mobile Conferencing Module receives a synchronization command from a host communications device, selects a synchronized object from the network-resident library, and communicates the synchronized object with presentation instructions to a mobile participant communications device. Furthermore, the mobile participant communications devices may communicate a synchronization confirmation back to the network-resident Mobile Conferencing Module. The synchronization confirmation acknowledges a successful presentation of the synchronized object to the mobile participant communications devices and may prevent the host (and/or network-resident Mobile Conferencing Module) from advancing to a subsequent synchronized object until the synchronization confirmation is received.

15 Claims, 8 Drawing Sheets

U.S. PATENT DOCUMENTS

| | | |
|---|---|---|
| RE38,457 E | 3/2004 | Rothrock et al. |
| 6,714,635 B1 | 3/2004 | Adams et al. |
| 6,791,974 B1 | 9/2004 | Greenberg |
| 6,857,009 B1 | 2/2005 | Ferreria et al. |
| 6,907,449 B2 | 6/2005 | Srinivasan |
| 7,007,003 B1 | 2/2006 | Rybicki |
| 7,068,680 B1 * | 6/2006 | Kaltenmark et al. ........ 370/469 |
| 7,165,112 B2 * | 1/2007 | Battin et al. ................ 709/230 |
| 7,328,243 B2 | 2/2008 | Yeager et al. |
| 7,353,252 B1 | 4/2008 | Yang et al. |
| 2002/0112004 A1 | 8/2002 | Reid et al. |
| 2002/0188678 A1 | 12/2002 | Edecker |
| 2003/0072429 A1 * | 4/2003 | Slobodin et al. ....... 379/202.01 |
| 2003/0093476 A1 | 5/2003 | Syed |
| 2003/0140121 A1 | 7/2003 | Adams |
| 2003/0191805 A1 * | 10/2003 | Seymour et al. ............ 709/204 |
| 2004/0103150 A1 * | 5/2004 | Ogdon et al. ............... 709/205 |
| 2004/0208303 A1 * | 10/2004 | Rajagopalan et al. .. 379/202.01 |
| 2004/0253991 A1 * | 12/2004 | Azuma ....................... 455/566 |
| 2004/0266412 A1 * | 12/2004 | Maes et al. ............... 455/414.4 |

* cited by examiner

NETWORK CONFERENCING USING METHOD FOR DISTRIBUTED COMPUTING AND/OR DISTRIBUTED OBJECTS FOR PRESENTATION TO A MOBILE COMMUNICATIONS DEVICE

CROSS REFERENCE TO RELATED APPLICATIONS

This application relates to applicant's co-pending U.S. application Ser. 10/831,517 entitled "Methods, Systems, and Products for Network Conferencing," filed Apr. 23, 2004, and of which the "Brief Summary of the Invention" and "Detailed Description of the Invention" sections are incorporated herein by this reference.

This application relates to applicant's co-pending U.S. application Ser. 10/853,871 entitled "Network Conference Using Method For Distributed Computing And/Or Distributed Objects," filed simultaneously herewith and of which the "Brief Summary of the Invention" and "Detailed Description of the Invention" sections are incorporated herein by this reference.

This application relates to applicant's co-pending U.S. application Ser. 10/854,055 entitled "Network Conferencing Using Method For Concurrent Real Time Broadcast And/Or Distributed Computing And Distributed Objects," filed simultaneously herewith and of which the "Brief Summary of the Invention" and "Detailed Description of the Invention" sections are incorporated herein by this reference.

This application relates to applicant's co-pending U.S. application Ser. 10/853,872 entitled "Network Conferencing Using Method For Distributed Computing And/Or Distributed Objects To Intermediate Host For Presentation To a Communications Device," filed simultaneously herewith and of which the "Brief Summary of the Invention" and "Detailed Description of the Invention" sections are incorporated herein by this reference.

This application relates to applicant's co-pending U.S. application Ser. 10/854,452 entitled "Methods, Systems, and Products for Network Conferencing," filed simultaneously herewith and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to conferencing over telecommunications and/or data networks and, more particularly, to conferencing, synchronizing, and/or managing a conference to a mobile communications device.

2. Description of the Related Art

Bandwidth is a problem when conferencing. Video and/or desktop conferencing, such as training sessions and other distributed presentations, often requires real-time streaming of the presentation materials. If the remote participants are few in number, and if the file size of the presentation materials is manageable, then real-time data streaming may provide an adequate quality of presentation. If, however, there are a large number of remote participants or the file size of the materials is quite large, then real-time streaming poses problems. As the number of remote participants increases and/or as the file size of the presentation materials increases, the required bandwidth also increases. Fifty (50) remote participants, for example, require fifty (50) real-time data streams fanning out from the host computer. As the number of remote participants increases, the host computer is also taxed to manage communications with all the remote computers. All the participants to the conference, then, eventually suffer from network congestion and from degradation in processor performance. The quality of the conference is reduced, and all the participants to the conference have a less-than-desirable experience. There is, accordingly, a need in the art for methods, systems, and products for improved conferencing among remote participants. There is also a need for reducing the bandwidth required when conferencing that does not rely upon real-time streaming.

BRIEF SUMMARY OF THE INVENTION

The aforementioned problems, and other problems, are reduced by this invention. This invention comprises methods, computer systems, computer programs, and computer program products that improve conferencing amongst one or more remote participants using a mobile communications device (referred to as a "mobile participant communications device). This invention leverages communication assets of a communications network providing communications services between a host communications device and the mobile participant communications device. The communications network includes a Mobile Conferencing Module and a library of digital objects for the presentation, and the host communicates with (or, alternatively, provides authority for) the Mobile Conferencing Module to manage the conference with the mobile participant communications device. This invention also includes features that help ensure that the mobile participant communications devices are synchronized to the host's presentation. As the conference host progresses through the presentation, this invention identifies to the host which mobile participant communications devices have viewed a current object (also referred to as the "synchronized object") of the presentation as well as which mobile participant communications devices are lagging behind and/or jumping ahead in the presentation materials. This invention can even include additional conference management features for the Mobile Conferencing Module of the communications network to manage the conference with the mobile participant communications devices. For example, the host can authorize the Mobile Conferencing Module to execute instructions/commands that enable a selected mobile participant communications device to exit the conference, delay presentment of the conference, provide unrestricted access of the entire presentation, provide authority to distribute presentation materials to a non-participant of the conference, allow modifications to the presentation, modify a communications connection with the mobile participant, and/or other features. Thus, the Mobile Conferencing Module can more quickly respond to the mobile participant communications device because the Mobile Conferencing Module can issue commands, respond to requests, and/or communicate presentation materials without having to request these from the host and then communicate them back to the mobile participant communications device. Consequently, the Mobile Conferencing Module of the communications network can tailor the conference to better suit the mobile participant(s). And, because the Mobile Conferencing Module and the library of digital objects is stored to the communications network, this invention does not require real-time streaming of presentation materials, so less bandwidth is required.

This invention discloses methods, systems, and products for conducting a conference amongst a mobile conferencing network. One of the embodiments describes a method for synchronizing presentation objects and/or for otherwise managing a remote participant using a mobile participant communications device. Initially, a host communications device and the mobile participant communications device are initialized. That is, the host communications device and the mobile participant communications device are identified along with one or more available communications connections between the host communications device and the mobile participant communications device. Prior to the conference, the host communications device communicates a library of digital objects and a Mobile Conferencing Module to a memory device of a communications network. The communications network connects the host communications device with the remote participant communications device and provides communication services for the one or more available communications connections. During the conference, the host communicates a synchronization command to the Mobile Conferencing Module of the communications network, and, in response to the synchronization command, the Mobile Conferencing Module selects an object from the library of digital objects stored to the memory device and communicates the object (also referred to herein as "the synchronized object") with presentation instructions to the mobile participant communications device. Then, the mobile participant communications device presents the synchronized object. Thereafter, a synchronization confirmation may be communicated from the mobile participant communications device to the Mobile Conferencing Module and then to the host communications device. The synchronization confirmation identifies the mobile participant communications devices and confirms a successful presentation of the object on the mobile participant communications devices.

Other embodiments of this invention describe a system for conducting and/or managing a conference amongst an intermediate host and mobile participants. The system comprises a Mobile Conferencing Module and a library of digital objects stored in a memory device, and a processor communicating with the memory device. During a conference, the Mobile Conferencing Module receives a synchronization command from a host communications device, and in response to the synchronization command, the Mobile Conferencing Module selects an object from the library of digital objects stored to the memory device and communicates the object to a mobile participant communications device. According to some embodiments, the communication to the mobile participant communications device also includes presentation instructions for presenting the object to the mobile participant communications device. The processor and memory device may reside in a component of a communications network that connects the host communications device with the mobile participant communications device. The communications network may include a telecommunications network (e.g., Public Switched Telephone Network (PSTN), a Mobile Switching Telephone Office (MSTO)), a data communications network (e.g., an Internet Protocol (IP) communications network), and/or a satellite network. For example, the Mobile Conferencing Module and library of digital objects may reside in a SoftSwitch (SSW), a Trunk Gateway (TGWs), an Application Server (AS), a Network Server (NS), and/or a Media Server (MS). After the synchronized object is presented to the mobile participant communications devices, a synchronization confirmation may be communicated to the Mobile Conferencing Module, and the Mobile Conferencing Module may then communicate the synchronization confirmation back to the host and/or the Mobile Conferencing Module may then provide another instruction/command to the mobile participant communications device. The synchronization confirmation confirms a successful presentation of the object on the mobile participant communications devices.

Other embodiments of this invention describe a computer program product. A computer-readable medium stores a Mobile Conferencing Module and a library of digital objects. The Mobile Conferencing Module receives a synchronization command from a host communications device, and in response to the synchronization command, the Mobile Conferencing Module selects an object from the library of digital objects stored to the memory device and communicates the object with presentation instructions to a mobile participant communications device. The computer-readable medium may reside in a component of a communications network that connects the host communications device with the mobile participant communications device. The communications network may include a telecommunications network (e.g., Public Switched Telephone Network (PSTN), a Mobile Switching Telephone Office (MSTO)), a data communications network (e.g., an Internet Protocol (IP) communications network), and/or a satellite network. For example, the Mobile Conferencing Module and library of digital objects may reside in a SoftSwitch (SSW), a Trunk Gateway (TGWs), an Application Server (AS), a Network Server (NS), and/or a Media Server (MS). After the synchronized object is presented to the mobile participant communications devices, a synchronization confirmation may the be communicated to the Mobile Conferencing Module, and the Mobile Conferencing Module may then communicate the synchronization confirmation back to the host and/or the Mobile Conferencing Module may provide another instruction/command to the mobile participant communications device. The synchronization confirmation confirms a successful presentation of the object on the mobile participant communications devices.

Other systems, methods, and/or computer program products according to embodiments will be or become apparent to one with skill in the art upon review of the following drawings and detailed description. It is intended that all such additional systems, methods, and/or computer program products be included within this description, be within the scope of this invention, and be protected by the accompanying claims.

BRIEF DESCRIPTION OF THE SEVERAL VIEWS OF THE DRAWINGS

These and other features, aspects, and advantages of the embodiments of this invention are better understood when the following Detailed Description of the Invention is read with reference to the accompanying drawings, wherein.

DETAILED DESCRIPTION OF THE INVENTION

Figure 1:
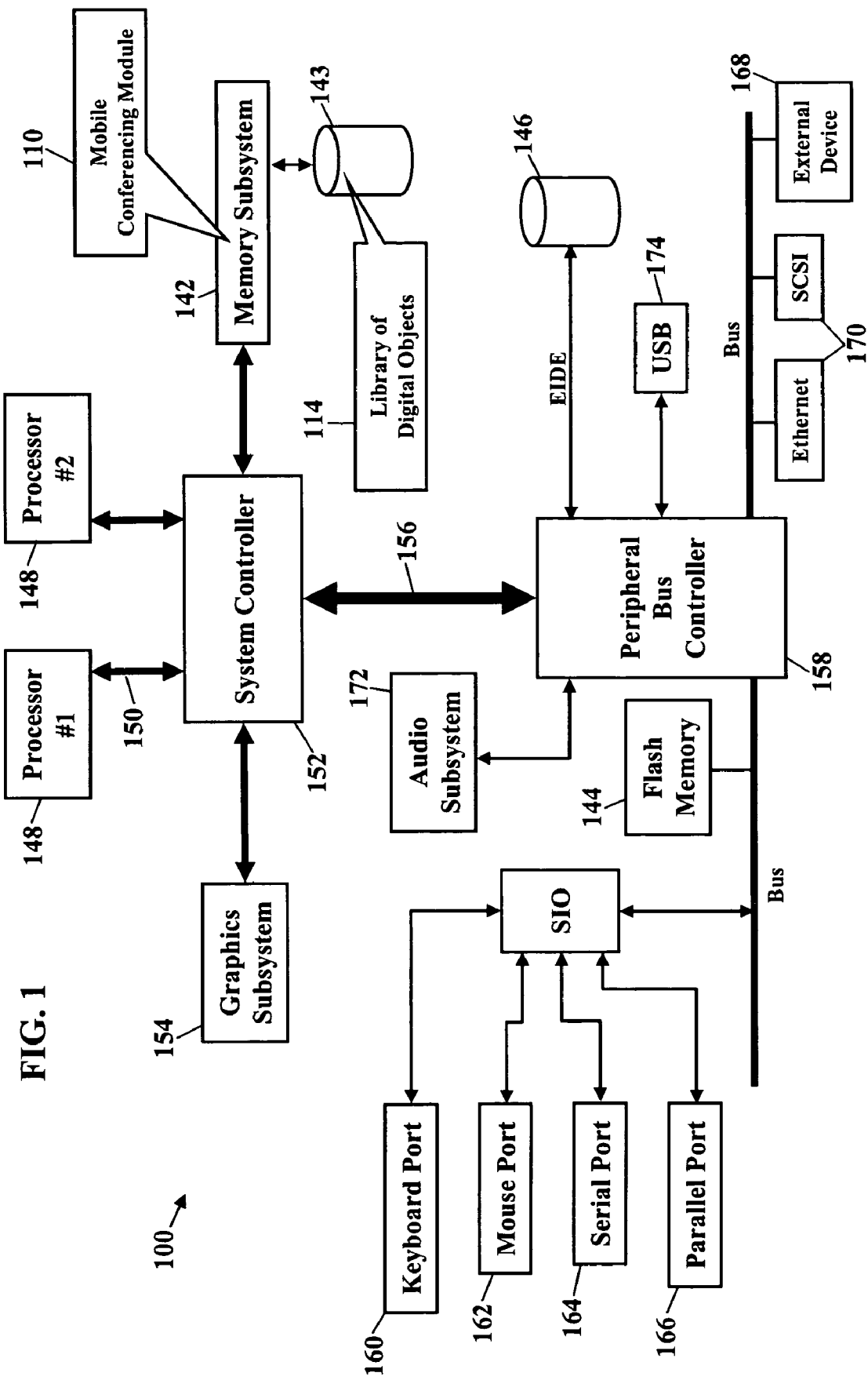
FIG. 1 illustrates a block diagram of an operating system according to some of the exemplary embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention improves conferencing among remote, mobile participants. A Mobile Conferencing Module of a conference host (referred to as the "host-resident Mobile Conferencing Module") communicates with a Mobile Conferencing Module of a communications network (referred to as the "network-resident Mobile Conferencing Module") to streamline presentation materials to remote, mobile participants. The communications network stores a library of digital objects, and when the network-resident Mobile Conferencing Module receives a synchronization command from the host, it formats a selected object (the synchronized object) for the recipient mobile participant communications device and communicates the object with presentation instructions to a mobile participant communications device. Consequently, this invention does not require real-time streaming of presentation materials, so less bandwidth is required. This invention also includes features that help ensure all mobile participants are synchronized to the host's presentation. As the conference host progresses through the presentation, this invention identifies to the host which mobile participants have viewed a current object (also referred to as the "synchronized object") of the presentation as well as which mobile participants are lagging behind and/or jumping ahead in the presentation materials. This invention can even prevent the host and/or the network-resident Mobile Conferencing Module from advancing in the presentation materials until all participants have viewed/heard/loaded the current object of the presentation. Furthermore, this invention includes additional features for the network-resident Mobile Conferencing Module to execute conference management commands to a mobile participant, such as, for example, a command to exit the conference, to delaying present of the conference, to provide unrestricted access to the entire presentation, to provide authority to distribute presentation materials to a non-participant of the conference, to provide authority to modify the presentation materials, and to change a communications connection of the mobile conferencing network. Thus, the network-resident Mobile Conferencing Module can more quickly respond to the mobile participant communications device because the Mobile Conferencing Module can issue commands, respond to requests, and/or communicate presentation materials without having to request these from the host and then communicate them back to the mobile participant communications device. Further, the Mobile Conferencing Module may further utilize communications assets of the communications network to dynamically communicate presentation materials. Consequently, the Mobile Conferencing Module of the communications network can tailor the conference to better suit the mobile participant(s).

FIG. 1 illustrates a block diagram showing the Mobile Conferencing Module 110 residing in a computer system 100. The computer system 100 may be any computing system, such as a personal computer (shown as reference numeral 100 in FIGS. 2, 3, and 5), a laptop/desktop computer, a tablet computer, and/or other computer systems including wired and wireless communications devices (such as a Voice over Internet Protocol (VoIP) phone 600 of FIG. 6). As FIG. 1 shows, the Mobile Conferencing Module 110 operates within a system memory device. The Mobile Conferencing Module 110, for example, is shown residing in a memory subsystem 142. The Mobile Conferencing Module 110, however, could also reside in flash memory 144 or a peripheral storage device 146. The computer system 100 also has one or more central processors 148 executing an operating system. The operating system, as is well known, has a set of instructions that control the internal functions of the computer system 100. A system bus 150 communicates signals, such as data signals, control signals, and address signals, between the central processor 148 and a system controller 152 (typically called a "Northbridge"). According to some of the embodiments of this invention, these signals include synchronization commands, synchronized objects, and/or synchronization confirmations described herein. The system controller 152 provides a bridging function between the one or more central processors 148, a graphics subsystem 154, the memory subsystem 142, and a PCI (Peripheral Controller Interface) bus 156. The PCI bus 156 is controlled by a Peripheral Bus Controller 158. The Peripheral Bus Controller 158 (typically called a "Southbridge") is an integrated circuit that serves as an input/output hub for various peripheral ports. These peripheral ports are shown including a keyboard port 160, a mouse port 162, a serial port 164 and/or a parallel port 166 for a video display unit, one or more external device ports 168, and networking ports 170 (such as SCSI or Ethernet). The Peripheral Bus Controller 158 also includes an audio subsystem 172. Those of ordinary skill in the art understand that the program, processes, methods, and systems described in this patent are not limited to any particular computer system or computer hardware. Other architectures are possible, and the Mobile Conferencing Module 110 can operate in any architecture.

Those of ordinary skill in the art also understand the central processor 148 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), Sun Microsystems, Inc. (4150 Network Circle, Santa Clara Calif. 95054, www.sun.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 142, flash memory 144, or peripheral storage device 146) may also contain an application program. The application program cooperates with the operating system and with a video display unit (via the serial port 164 and/or the parallel port 166) to provide a Graphical User Interface (GUI). The Graphical User Interface typically includes a combination of signals communicated along the keyboard port 160 and the mouse port 162. The Graphical User Interface provides a convenient visual and/or audible interface of the Mobile Conferencing Module 110 with a user (e.g., a conference host) of the computer system 100.

Figure 2:
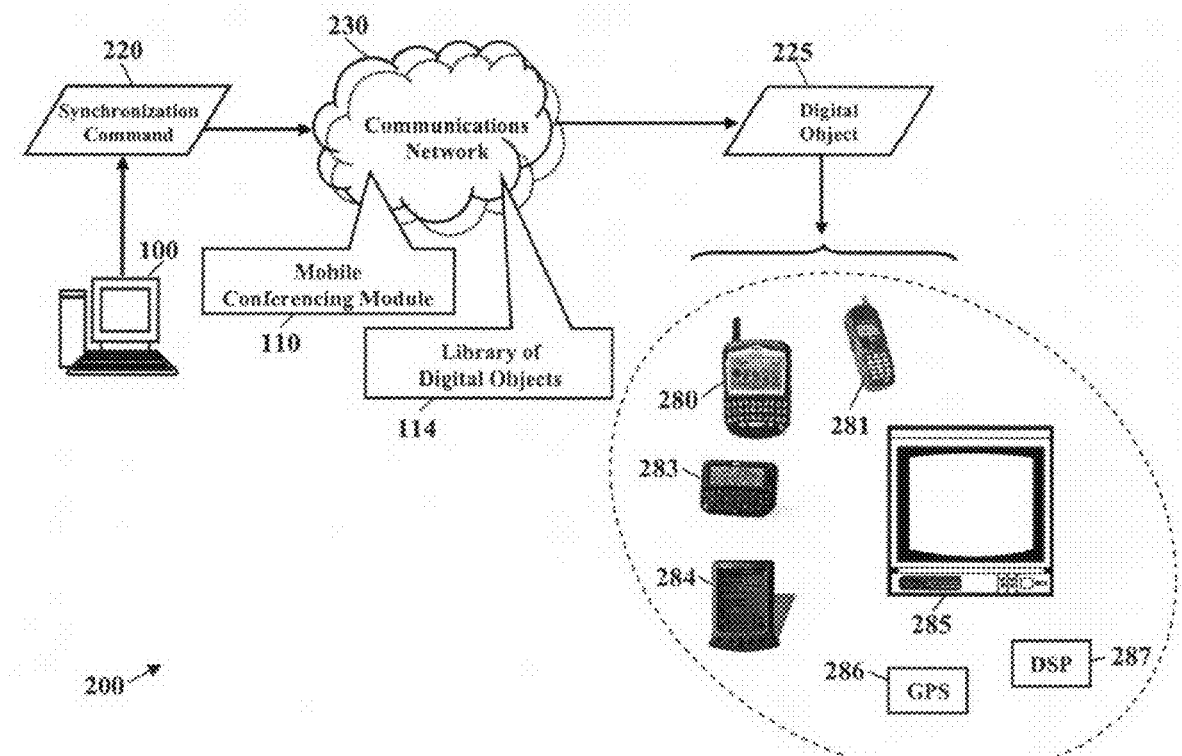
FIGS. 2-3 are schematics illustrating a mobile conferencing network for conferencing, synchronization, and management according to some of the exemplary embodiments of this invention.

FIG. 2 is a schematic of a mobile conferencing network 200 illustrating some of the embodiments this invention. These embodiments include methods, systems, computer programs, and/or computer program products that manage a conferencing session amongst mobile participant communications devices. A host-resident Mobile Conferencing Module 110 of host computer system 100 initially manages the conferencing session via a communications interface with a network-resident Mobile Conferencing Module 110 of a communications network 230 providing communications services to at least one mobile participant communications devices 280. These mobile participant communications devices 280 include cellular phone 281, VoIP phone 282, a pager 283, personal digital assistant (PDA) 284, an interactive television 285, a Global Positioning System (GPS) device 286, and/or any wireless communications device having a digital signal processor 287. Prior to a scheduled date and time for the conference, a library 114 of digital objects is communicated to a memory device (not shown in FIG. 2) of the communications network 230. Prior to the scheduled date and time for the conference, the Mobile Conferencing Module 110 may also be communicated to the memory device of the communications network 230. The communications network 230 may include a telecommunications network (e.g., Public Switched Telephone Network (PSTN), Mobile Switching Telephone Office (MSTO), and others), a data network (e.g., an Internet (sometimes alternatively known as the "World Wide Web"), an intranet, a local-area network (LAN), and/or a wide-area network (WAN)), and/or a satellite network. Alternatively, the library 114 of digital objects and/or the Mobile Conferencing Module 110 may be communicated/distributed via physical media, such as a CDROM, memory card, disk, and/or other memory storage device according to other embodiments of this invention. The library 114 of digital objects can be any audible and/or visual presentation materials. The library 114 of digital objects, for example, may include slides (such as MICROSOFT® POWERPOINT® file(s)), pictures, documents, audio, video, and/or any other computer file that can be stored on and/or presented to the participants communications devices 140, 142, 144,1 46, 148, 150, 152, 154, 156, and 158 (MICROSOFT® and POWERPOINT® are registered trademarks of Microsoft Corporation, One Microsoft Way, Redmond Wash. 98052-6399, (425) 882-8080).

This invention reduces bandwidth requirements. This invention sends and/or stores the presentation materials and/or the network-resident Mobile Conferencing Module 110 to the communications network 230 ahead of the scheduled date and time of the conference, and thus eliminates the often-cumbersome real-time distribution of presentation materials from the host communications device 100. Since the communications network 230 stores the presentation materials, the mobile participant communications device 280 need not locally store the entire presentation. That is, because the communications network 230 stores the library 114 of digital objects, only individual objects from the library 114 need be selectively downloaded to the mobile participant communications device 280. The mobile participant communications device 280, then, need not require a high bandwidth connection to participate in the conference. And, because the network-resident Mobile Conferencing Module 110 may have authority to manage the conference for a selected mobile participant, conference communications and/or commands/instructions to the selected mobile participant are streamlined to leverage communication assets of the communications network 230.

This invention leverages the assets of the communications network 230 within the mobile conferencing network 100. Prior to communicating the library 114 of digital objects and/or the Mobile Conferencing Module 110, the host computer 100 transmits an initialization command to identify each mobile participant communications device, a communications address (e.g., telephone number, IP address, and so on) of the mobile participant communications device, an available communication connection between the host computer 100 and the mobile participant communications device, and a network memory device of the available communications connection. The host computer 100 may further analyze transmission rates, costs, a security factor, a reliability factor, and other factors to select a communications connection and network memory device for that communications connection. Alternatively, the communications connection and/or network memory device may be identified by an administrator and/or a user, (e.g., a host user or a participant user). Regardless of how the communications connection and/or the network memory device is determined, the host computer 100 accesses the list for communication instructions from the host computer 100 to the network memory device of the communications network 230 and/or for communication instructions from the network memory device of the communications network 230 to the mobile participant communications device 280. The host computer may communicate the list to the network memory device of the communications network 230 and/or to the mobile participant communications device 280. After the library 114 and the network-resident Mobile Conferencing Module 110 are communicated to the memory device of the communications network 230, the host computer 100 may also use the list to confirm that the memory device has access to and/or stored the library 114 and the Mobile Conferencing Module 110, and, if desired, verify an available communications path from the memory device of the communications network 230 with the mobile participant communications device 280.

The mobile conferencing network 100 communicates a message (e.g., a synchronization command, a conference management command, and/or authority to the memory device to execute one or more conference management commands) from the host computer 100 to a memory device of the communications network 230. Then, in response, the network-resident Mobile Conferencing Module 110 communicates a message (e.g., a synchronized object with presentation instructions and/or a conference management command) to an associated mobile participant communications device 280. For example, when the conference begins, the host-resident Mobile Conferencing Module 110 communicates a synchronization command (also referred to as "Sync Confirm") 220 from the host computer 100 to the memory device of the communications network 230. Then, the network-resident Mobile Conferencing Module 110 receives the synchronization command 220 and (1) selects the synchronized object 225 from the library 214 of digital objects stored to the communications network 230 and (2) communicate the synchronized object 225 and presentation instructions within the mobile conferencing network 200 to the mobile participant communications device 280. Thereafter, the synchronized object 225 is visually and/or audibly presented to the mobile communications device 280. That is, for example, as the host communications device 100 switches from one synchronized object 225 to another synchronized object 225 in the library 114 of digital objects, the network-resident Mobile Conferencing Module 110 receives the synchronization commands 220 and communicates the synchronized object 225 to an associated mobile participant communications device 280 so that all of the participants "follow along" and synchronize with the host. According to embodiments of this invention, the synchronized object 225 may be communicated with presentation instructions to the mobile participant communications device 280. Still, according to further embodiments, the network-resident Mobile Conferencing Module 110 may switch from one synchronized object 225 to another synchronized object 225 in the library 114 when the host communications device 100 enables a synchronization override command to the network-resident Mobile Conferencing Module 110 such that the network-resident Mobile Conferencing Module 110 autonomously manages communications and selection of the synchronized object 225 to the mobile participant communications device 280 during the conference (or, alternatively, at a non-conference time).

Figure 3:
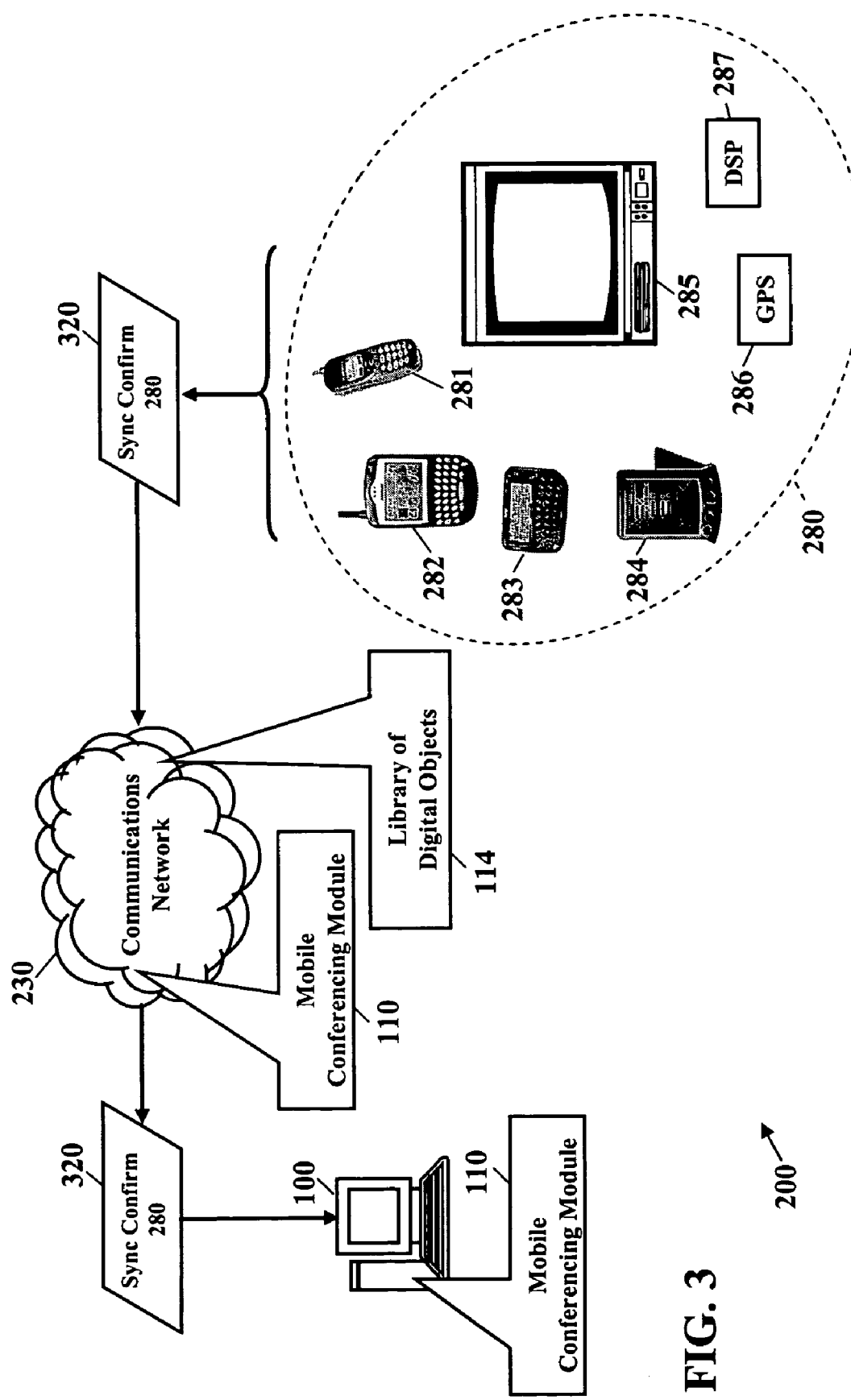

FIG. 3 is a schematic illustrating some more of the embodiments of this invention. After the synchronization command (shown as reference numeral 220 in FIG. 2) is communicated within the mobile conferencing network 200, the mobile participant communications device 280 may also acknowledge synchronization. When the mobile participant communications device 280 successfully presents the synchronized object 225, then that mobile participant communications device 280 communicates a synchronization confirmation (also referred to as "Sync Confirm 280" to refer to the synchronization confirmation of mobile participant communications device 280) 320 via the communications network 230 to the host communications device. According to embodiments of this invention, the mobile participant communications device 280 may communicate the synchronization confirmation 320 to the network-resident Mobile Conferencing Module 110, and then, network-resident Mobile Conferencing Module 110 communicates the synchronization confirmation 320 to the host communications device 100 (and/or, the network-resident Mobile Conferencing Module 110 can communicate another synchronization confirmation 320 and/or a conference management command without communicating with the host communications device 100). According to an alternate embodiment of this invention, the mobile participant communications device 280 may communicate the synchronization confirmation 320 to the host communications device 100 via the communications network 230 without communicating with the network-resident Mobile Conferencing Module 110. The synchronization confirmation 320 acknowledges the successful presentation of the synchronized object to the mobile participant communications devices. Alternatively, the synchronization confirmation 320 may also report an unsuccessful presentation of the synchronized object 225 to the mobile participant communications device 280.

The synchronization confirmation 320 provides several advantages. The synchronization confirmation 320 may help to ensure and/or to provide helpful information that the mobile participants are synchronized before the host and/or network-resident Mobile Conferencing Module 110 advances to the next object in the library 114 of digital objects. The host communications device 100 and/or the network-resident Mobile Conferencing Module 110, for example, may use the synchronization confirmation 320 to delay communication of any subsequent synchronized object 225. The host (or, alternatively, the network-resident Mobile Conferencing Module 110) then may choose to wait until each mobile participant communications device 280 return communicates the synchronization confirmation 320. For example, the host (or, alternatively the network-resident Mobile Conferencing Module 110) may choose to not jump to another object 225 in the library 114 until all mobile participant communications devices 280 have successfully presented the synchronized object 225. The sync confirmation 320 can even visually and/or audibly inform the host communications device 100 and/or the network-resident Mobile Conferencing Module 110 which of the mobile participant communications devices 280 is synchronized and which of the mobile participants is not synchronized.

In an exemplary embodiment, the synchronization confirmation 320 may also include additional information, such as a request from one (or more) of the mobile participant communications devices 280 to the associated network-resident Mobile Conferencing Module 110, or alternatively, to the host communications device 100. For example, mobile participant communications device 280 may communicate the synchronization confirmation 320 with a request to exit the conference. This request may be communicated with the synchronization confirmation 320 to the network-resident Mobile Conferencing Module 110 such that the network-resident Mobile Conferencing Module 110 can identify the request from mobile participant communications device 280 to exit the conference and can immediately provide a command to respond to the request and modify future communications accordingly (e.g., if mobile participant communications device 280 exits the conference, then the network-resident Mobile Conferencing Module 110 will terminate communication of subsequent synchronized object 225 to mobile participant communications device 280). Alternatively, when the network-resident Mobile Conferencing Module 110 communicates the next synchronized object 225, that subsequent synchronized object 225 may include commands and/or instructions that enable the mobile communications device 280 to exit the conference and that terminate subsequent synchronized objects 225 to mobile communications device 280.

In further exemplary embodiments, the synchronization confirmation 320 may include other requests. The synchronization confirmation 320, for example, may include a request to delay presentment of the synchronized object, a request to access to a non-synchronized digital object, a request for authority to distribute the object to a non-participant of the conference, a request for authority to modify the object, and a request to terminate further communication of the synchronization confirmation. In response to the synchronization confirmation 320 with the request, a subsequent synchronized object 225 may provide commands and/or instructions that enable the request of the mobile participant, such as commands and/or instructions to delay presentment of the synchronized object, to access to any object from the library of digital objects, to distribute the object to the non-participant, to modify the object, and/or to terminate further communication of the synchronized object.

According to some of the embodiments, the network-resident Mobile Conferencing Module 110 can also ignore the synchronization confirmation 320. The synchronization confirmation 320, as explained above, provides a tool that may help ensure that all associated mobile participants are synchronized with an associated network-resident Mobile Conferencing Module 110 (and, ultimately, with the host) before the network-resident Mobile Conferencing Module 110 advances to the next object in the library of digital objects. The network-resident Mobile Conferencing Module 110, however, can also be configured (prior to or during the conference) to ignore receipt of one or more synchronization confirmations 320. That is, the network-resident Mobile Conferencing Module 110 may advance to a subsequent object in the library 114 without first receiving the synchronization confirmation 320 from the mobile participant communications device 280. This feature may also allow the mobile participants to request any object in the library 114 such that they can "jump" ahead, or lag behind, and view/hear any object. For example, the network-resident Mobile Conferencing Module 110 might determine that some associated mobile participants need not be synchronized. If, for example, the conference is a training session, some portions of the training session might already be known to some participants, so these participants are selected and are not required to synchronize. Other criteria for selecting a participant may be to select a mobile participant communications device 280 with an unreliable and/or slow communications path. However the participant is selected, the network-resident Mobile Conferencing Module 110 (or, alternatively, the host communications device 100) can be configured to ignore receipt of the synchronization confirmation 320 from these selected mobile participants. Thus, the network-resident Mobile Conferencing Module 110 may be configured to advance/return to any object in the library 114 without first receiving the synchronization confirmation 320 from the selected mobile participant communications device 280.

Figure 4:
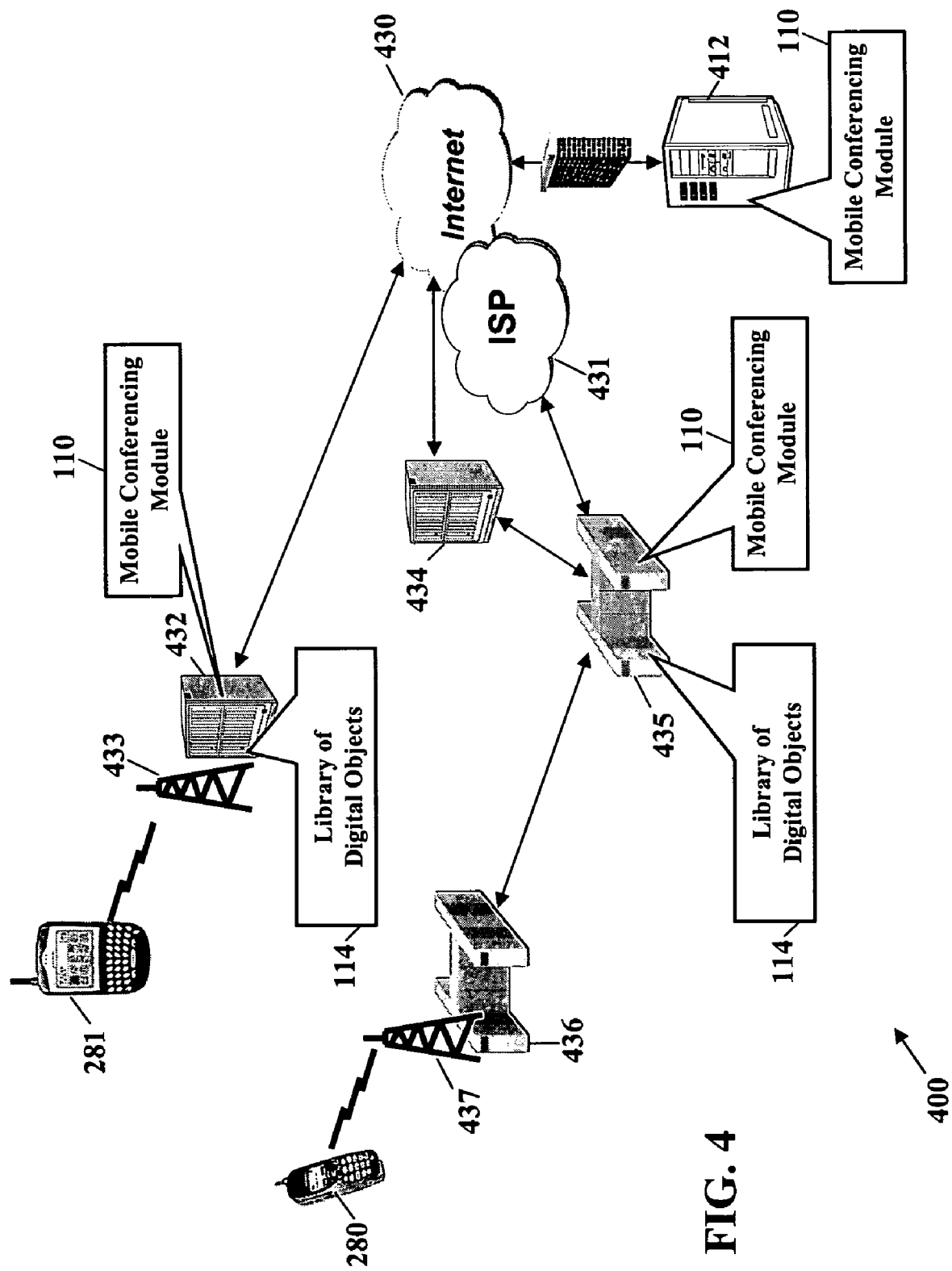
FIG. 4 is a schematic illustrating another mobile conferencing network for conferencing, synchronization, and management according to some of the exemplary embodiments of this invention.
Figure 5:
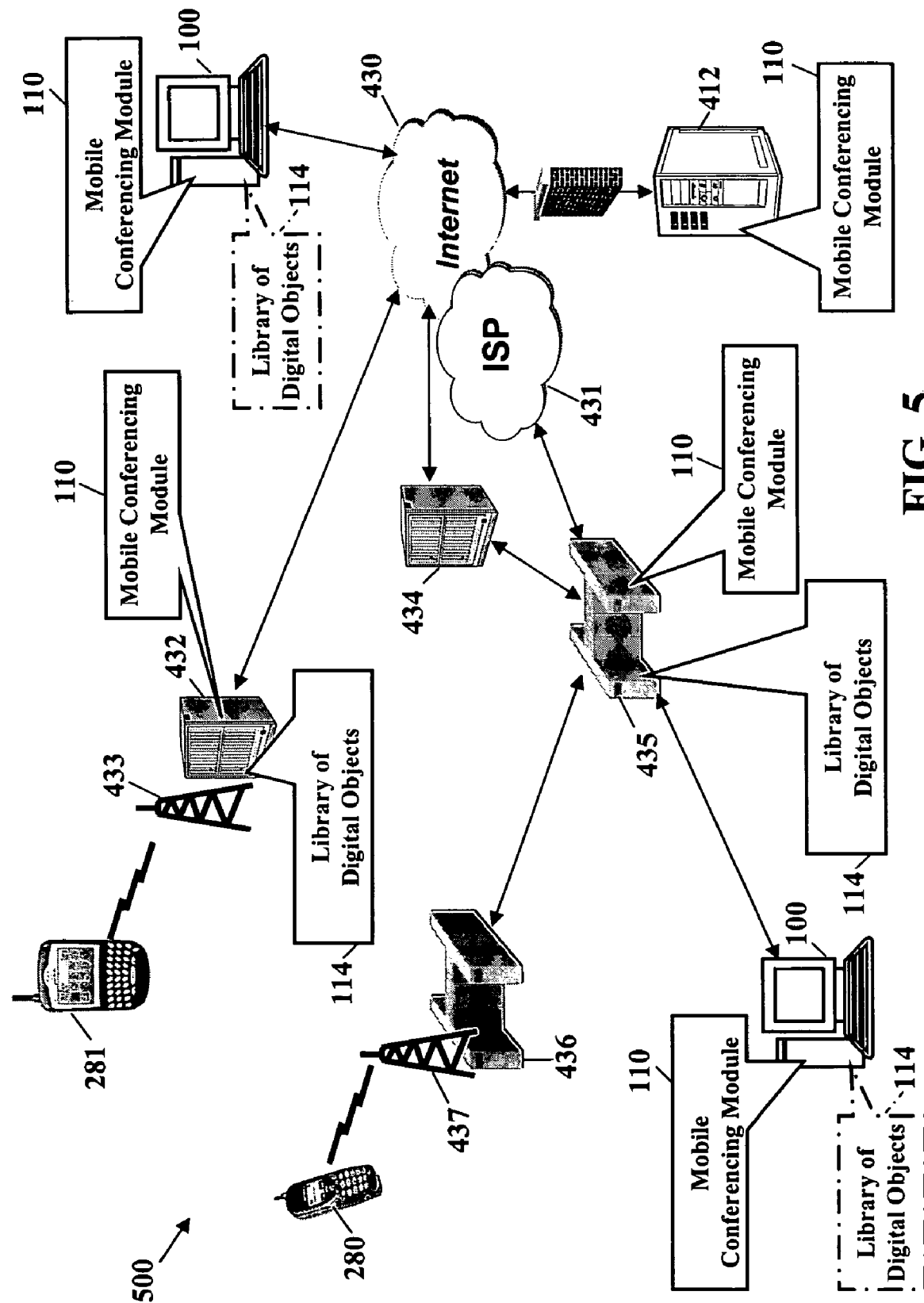
FIG. 5 is a schematic depicting another mobile conferencing network for conferencing, synchronization, and management according to some of the exemplary embodiments of this invention.

FIGS. 4 and 5 illustrate mobile conferencing networks 400 and 500 that illustrate more detailed operating environments according to some of the exemplary embodiments of this invention. The mobile conferencing network 400 of FIG. 4 includes at least one host computer system 100 having the Mobile Conferencing Module 110 and, optionally, the library 114 of digital objects, the cellular phone 281, the VoIP phone 282, and a communications network that includes a data network shown as Internet 430, a dataserver 412 having the network-resident Mobile Conferencing Module 110, an Internet Service Provider (ISP) 431, a wireless data gateway 432 having the network-resident Mobile Conferencing Module 110 and the library 114 of digital objects, a wireless data gateway antenna 433, a VoiceXML gateway 434 and includes a telecommunications network shown as a central office (CO) 435 having the network-resident Mobile Conferencing Module 110 and the library 114 of digital objects, a mobile switching telephone office (MSTO) 436, and a mobile communications antenna 437. According to further embodiments of this invention, the network-resident Mobile Conferencing Module may be stored to a SoftSwitch (SSW), a Trunk Gateway (TGWs), an Application Server (AS), a Network Server (NS), a Media Server (MS), and/or other memory devices of alternate communications network components.

As shown in. FIG. 4, a conference is established between the server 412 (i.e., the host participant), the mobile participant using VoIP phone 280, and the mobile participant using cellular phone 281. The server 412 communicates the synchronization command via the communications network to (1) the wireless data gateway 432 communicating with the VoIP phone 280 and (2) the CO 435 communicating via MSTO 436 with the cellular phone 281. In response to the synchronization command, each of the network-resident Mobile Conferencing Modules 110 selects the synchronized object from the library 114 of digital objects and communicates the synchronized object with presentation instructions to the associated mobile participant communications device. For example, the CO 435 communicates the synchronized object to cellular phone 281 with signaling via MSTO 436 and antenna 437. The mobile conferencing network 500 of FIG. 5 is similar to mobile conferencing network 400 of FIG. 4; however, mobile conferencing network 500 further includes the host computer system 100 having communications connections with the telecommunications network via CO 435 (such as a digital subscriber line (DSL) and modem connection) and with the data communications network via Internet 430 (such as an Ethernet connection via a local area network or a wide area network). And, in mobile conferencing network 500, server 412 may be an integrated component of Internet 430. During the conference, the host computer system 100 may communicate the synchronization command to (1) the network-resident Mobile Conferencing Module 110 of server 412, (2) the network-resident Mobile Conferencing Module 110 of wireless data gateway 432, and/or (3) the network-resident Mobile Conferencing Module 110 of CO 435. Regardless of which network-resident Mobile Conferencing Module 110 the host communicates with, each of the network-resident Mobile Conferencing Modules 110 (i.e., the network-resident Mobile Conferencing Module 110 of server 412, the network-resident Mobile Conferencing Module 110 of wireless data gateway 432, and/or the network-resident Mobile Conferencing Module 110 of CO 435) may select the synchronized object and communicate the synchronized object to any of the mobile participant communications devices 280 and 281 via the communications network. Consequently, if one of the network-resident Mobile Conferencing Modules 110 cannot establish a communications connection with one of the mobile participant communications device 280, 281, then another of the network-resident Mobile Conferencing Modules 110 may be used to establish an alternate communications connection.

Figure 6:
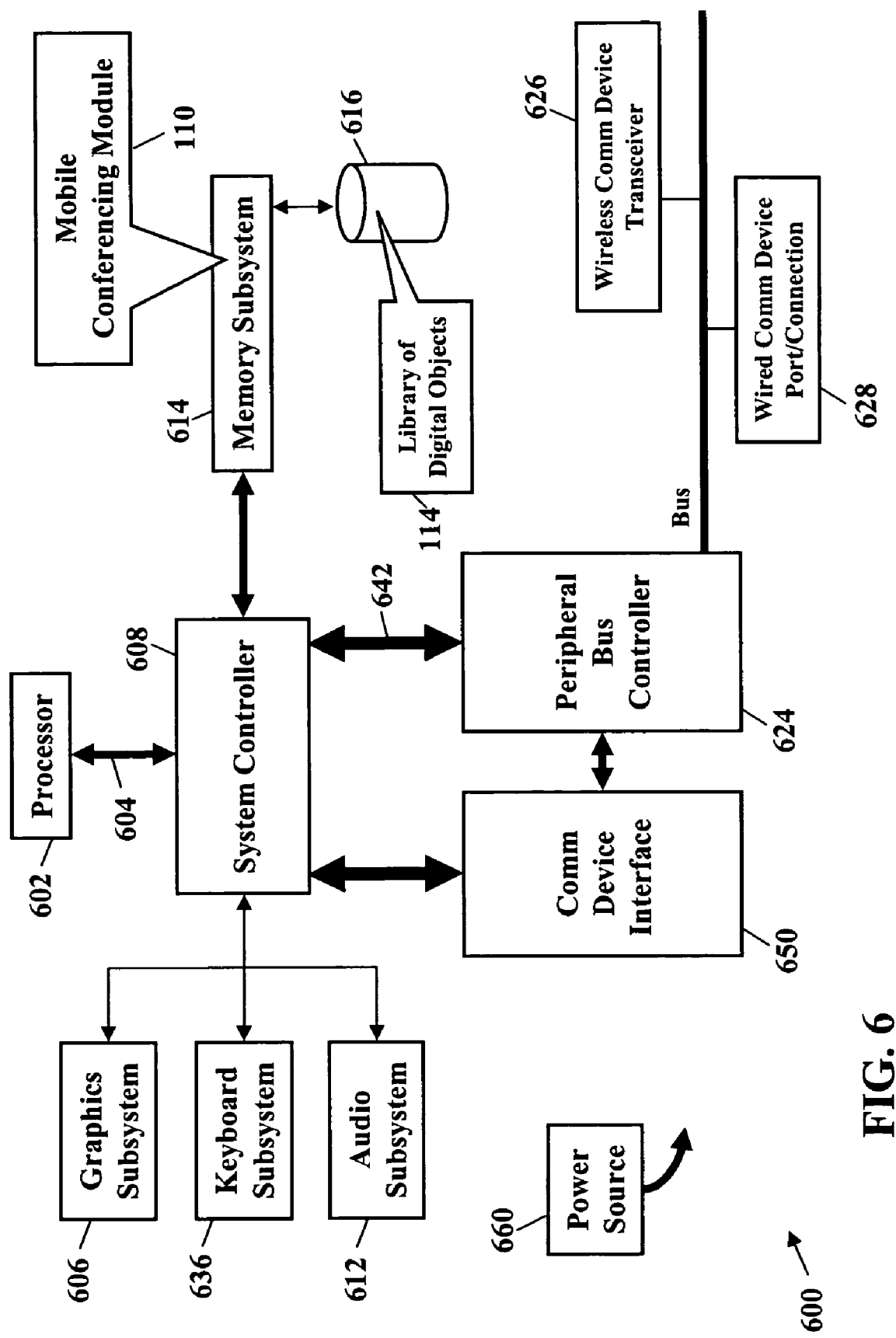
FIG. 6 illustrates another block diagram of an operating system according to some of the exemplary embodiments of this invention.

FIG. 6 illustrates another block diagram showing the Mobile Conferencing Module 110 residing in an alternate host communications device of a voice/data communications device 600 (i.e., a VoIP phone, or alternatively, another voice/data communications device). As FIG. 6 shows, the Mobile Conferencing Module 110 operates within a system memory device. The Mobile Conferencing Module 110, for example, is shown residing in a memory subsystem 614. The Mobile Conferencing Module 110, however, could also reside in flash memory 626 or a peripheral storage device 616. The voice/data communications device 600 also has one or more central processors 602 executing an operating system. The operating system, as is well known in the art, has a set of instructions that control the internal functions of the voice/data communications device 600. A communications interface 604 communicates signals, such as data signals, control signals, and address signals, between the central processor 602 and a system controller 608 (typically called a "Northbridge"). Additionally, the communications interface 604 has a means to communicate a communications signal between the voice/data communications device 600 and a communications network.

The system controller 608 provides a bridging function between the one or more central processors 602, a graphics subsystem 606, a keyboard subsystem 636, an audio subsystem 612, the memory subsystem 614, a PCI (Peripheral Controller Interface) bus 642, and a Communications ("Comm") Device Interface 650. The PCI bus 642 is controlled by a Peripheral Bus Controller 624. The Peripheral Bus Controller 624 (typically called a "Southbridge") is an integrated circuit that serves as an input/output hub for various peripheral ports and/or transceivers. These peripheral ports allow the voice/data communications device 600 to communicate with a variety of devices through networking ports (such as SCSI or Ethernet) and/or transceivers that include Wireless Communications ("Comm") Device Transceiver 626 (for communication of any frequency signal in the electromagnetic spectrum, such as, for example, Wireless 802.11 and Infrared) and Wired Communications ("Comm") Device Port/Connection 628 (such as modem V90+ and compact flash slots). These peripheral ports could also include other networking ports, such as, a serial port (not shown) and/or a parallel port (not shown). The Comm Device Interface 650 allows the voice/data communications device 600 to monitor, detect, receive, and decode incoming (and outgoing) communications signals to the communications device(s) connected to the Wireless Comm Device Transceiver 626 and/or the Wired Comm Device Port/Connection 628. Further, the Comm Device Interface 650 may transmit the communications signal to the Wireless Comm Device Transceiver 626 and/or the Wired Comm Device Port/Connection 628. Still further, the voice/data communications device 600 may include a power source 660, such as a rechargeable battery to provide power and allow the voice/data communications device 600 to be portable. Additionally, those of ordinary skill in the art understand that the program, processes, methods, and systems described in this patent are not limited to any particular computer system or computer hardware.

Figure 7:
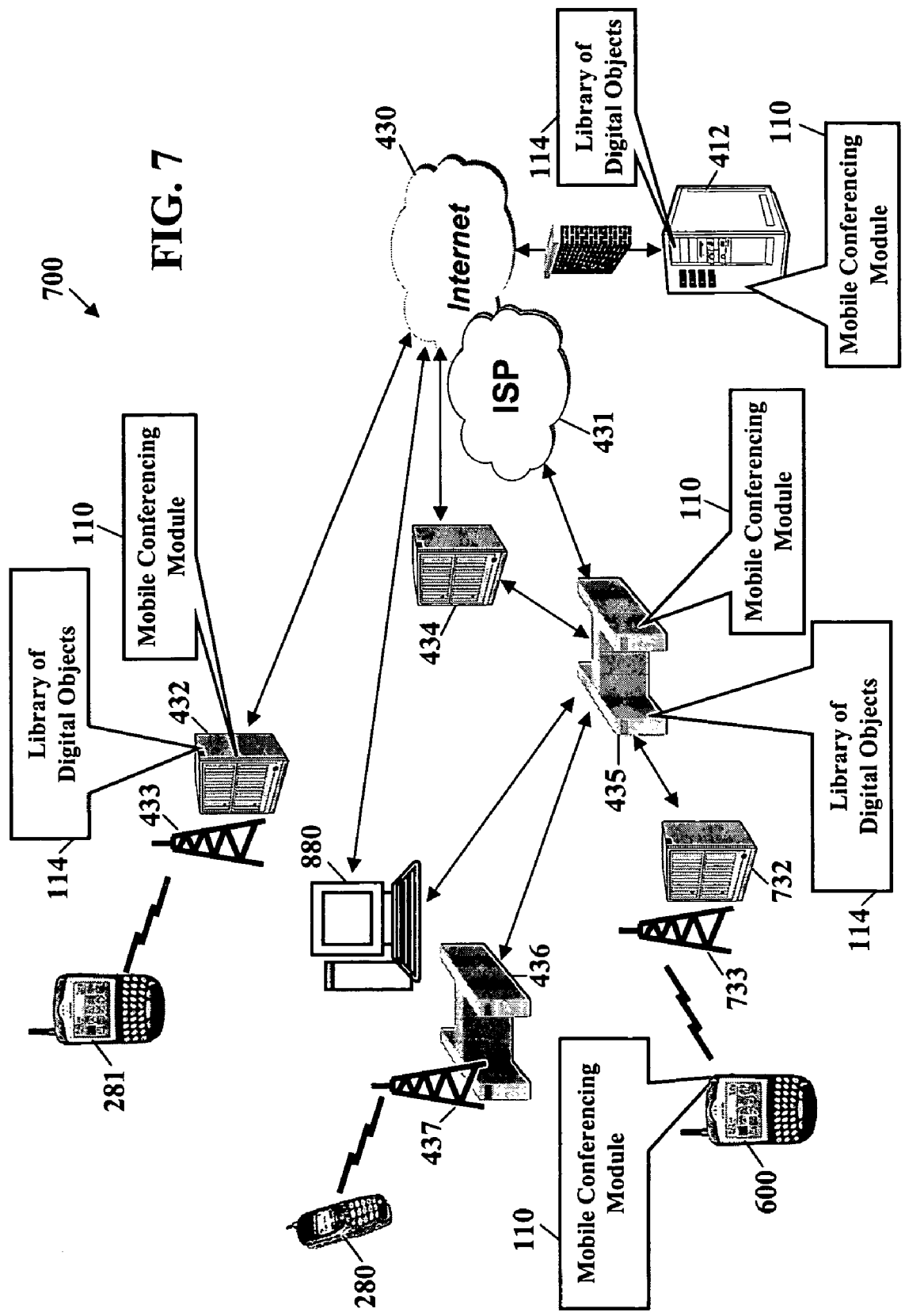
FIG. 7 is a schematics illustrating still another mobile conferencing network for conferencing, synchronization, and management according to some of the exemplary embodiments of this invention.

FIG. 7 illustrates a mobile conferencing network 700 similar to mobile conferencing network 500; however, mobile conferencing network 700 includes the host voice/data communications device of FIG. 6 shown as a host VoIP phone 600 (instead of host computer system 100). The host VoIP phone 600 communicates with the communications network via a signaling path of another wireless data gateway 732 and another wireless data gateway antenna 733 communicating with CO 435. The host-resident Mobile Conferencing Module 110 communicates the synchronization command (and/or another conference management command and/or a synchronization override command) to the network-resident Mobile Conferencing Module 110 of server 412, the network-resident Mobile Conferencing Module 110 of wireless data gateway 432, and/or the network-resident Mobile Conferencing Module 110 of CO 435. And, in response to the synchronization command (or alternate command), the network-resident Mobile Conferencing Module 110 selects and retrieves the synchronized object 114 from the library and communicates the object to one or more of the mobile participant communications devices 280, 281. Thereafter, the synchronization confirmation (and/or a request from the mobile participant) may be communicated from the mobile participant communications device to the network-resident Mobile Conferencing Module 110 and/or to the host VoIP phone 600. An advantage of this operating system is that the host VoIP phone 600 is mobile and communications connections with the host VoIP phone 600 may change during the conference as the host VoIP phone 600 travels to different geographic locations. Consequently, using the network-resident Mobile Conferencing Module 110 and network-resident library 114 of digital objects to manage the conference and/or communicate synchronization commands to the mobile participant communications device 280, 281 provides greater flexibility to the host VoIP phone 600 and may minimize communications costs because less "air-time" is used by the VoIP phone 600 for conference communications.

Figure 8:
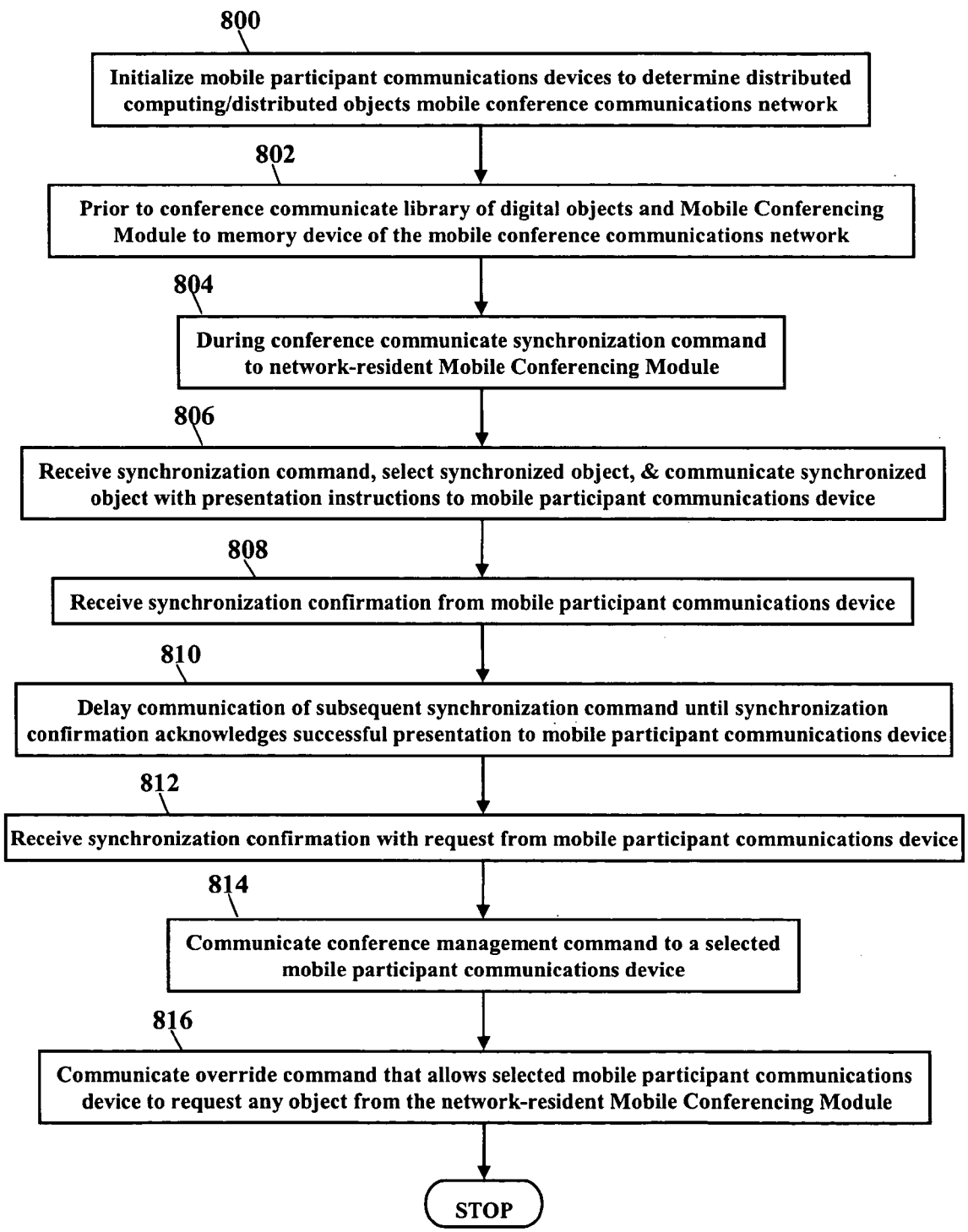
FIG. 8 is a flowchart illustrating a conferencing, synchronization, and management method according to some of the exemplary embodiments of this invention.

FIG. 8 is a flowchart illustrating an exemplary method of conducting a conference amongst intermediate host participants. Prior to the conference, a list of mobile participant communications devices is initialized to determine an available communications connection via a communications network to each of the mobile participant communications device (Block 800), and then, a library of digital objects and a Mobile Conferencing Module are communicated to a memory device of a mobile communications networks (Block 802). Then, during the conference, a synchronization command is communicated from a host communications device to the network-resident Mobile Conferencing Module 110 (Block 804). The network-resident Mobile Conferencing Module receives the synchronization command, selects the synchronized object from the library, and communicates the synchronized object with presentation instructions to the mobile participant communications device (Block 806). After the synchronized object is presented to the mobile participant communications devices, a synchronization confirmation is then received to acknowledge a successful (or, alternatively, unsuccessful) presentation of the synchronized object (Block 808). The method may also delay communication of a subsequent synchronized object until the synchronization confirmation is received from the mobile participant communications devices (Block 810). The method may also include the network-resident Mobile Conferencing Module 110 receiving the synchronization confirmation with a request from a particular mobile participant (Block 812). For example, the synchronization confirmation may include a request to exit the conference. A conferencing management command may be sent similar to the synchronized object or, alternatively with the synchronized object, such that supplemental commands and/or instructions (e.g., command that enables a selected mobile participant to email the library to a non participant) may also be communicated to a selected mobile participant communications device (Block 814). And, finally, the method may include the host (or, alternatively, the network-resident Mobile Conferencing Module 110) communicating a synchronization override command that allows a selected mobile participant communications device to request any object from the network-resident Mobile Conferencing Module 110 (Block 816).

The Mobile Conferencing Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Mobile Conferencing Module to be easily disseminated. A computer program product for conducting a conference amongst remote, mobile participants includes the Mobile Conferencing Module stored on the computer-readable medium. The Mobile Conferencing Module receives a synchronization command from a host communications device, and in response to the synchronization command, the Mobile Conferencing Module selects an object from the library of digital objects stored to the memory device and communicates the object with presentation instructions to a mobile participant communications device. The computer-readable medium may reside in a component of a communications network that connects the host communications device with the mobile participant communications device. The communications network may include a telecommunications network (e.g., Public Switched Telephone Network (PSTN), a Mobile Switching Telephone Office (MSTO)), a data communications network (e.g., an Internet Protocol (IP) communications network), and/or a satellite network. For example, the Mobile Conferencing Module and library of digital objects may reside in a SoftSwitch (SSW), a Trunk Gateway (TGWs), an Application Server (AS), a Network Server (NS), and/or a Media Server (MS). After the synchronized object is presented to the mobile participant communications devices, a synchronization confirmation may the be communicated to the Mobile Conferencing Module, and the Mobile Conferencing Module may then communicate the synchronization confirmation back to the host and/or the Mobile Conferencing Module may provide another instruction/command to the mobile participant communications device. The synchronization confirmation confirms a successful presentation of the object on the mobile participant communications devices.

The Mobile Conferencing Module may also be physically embodied on or in any addressable (e.g., HTTP, I.E.E.E. 802.11, Wireless Application Protocol (WAP)) wireline and/or wireless communications device capable of presenting an IP address. Examples could include a computer, a wireless personal digital assistant (PDA), an Internet Protocol mobile phone, or a wireless pager.

While this invention has been described with respect to various features, aspects, and embodiments, those skilled and unskilled in the art will recognize the invention is not so limited. Other variations, modifications, and alternative embodiments may be made without departing from the spirit and scope of this invention.

What is claimed is:

1. A method of conducting a conference, comprising:
   initializing the conference amongst a host communications device, an intermediate host communications device, and a remote, mobile participant communications device;
   prior to the conference, communicating a library of digital objects from the host communications device to the intermediate host communications device;
   during the conference, communicating a synchronization command from the host communications device to the intermediate host communications device that instructs the intermediate host communications device to retrieve an object from memory during the conference;
   communicating the object from the intermediate host communications device to the mobile participant communications device during the conference;
   forcing the host communications device to await receipt of a synchronization acknowledgement from the mobile participant communications device before advancing to another object in the library of digital objects, the synchronization acknowledgement thus confirming that the object was successfully presented on the mobile participant communications device;
   analyzing a communications path between the host communications device and the mobile participant communications device to identify at least one available memory device;
   determining transmission rates between the host communications device, the available memory device, and the mobile participant communications device; and
   using the transmission rates to select the memory device from the at least one available memory device.

2. The method of claim 1, further comprising receiving at least one of (i) a command to exit the conference, (ii) a command to delay presentment of the conference, (iii) a synchronization override command to access to any object from the library of digital objects stored to the memory device, (iv) authority to distribute the object to a non-participant, (v) authority to modify the object, (vi) a command to terminate further communication of a synchronization confirmation, and (vii) a command to modify a communications connection of the conference.

3. The method of claim 1, further comprising receiving the synchronization acknowledgement from the mobile participant communications device that confirms a successful presentation of the object at the mobile participant communications device.

4. The method of claim 1, further comprising delaying communication of a subsequent synchronization command until the synchronization acknowledgment is received from the mobile participant communications device.

5. The method of claim 1, further comprising sending a synchronization override command to the mobile participant communications device, the synchronization override command allowing the mobile participant communications device to progress through the library of objects and to select any object from the library of digital objects, such that the host communications device need not await receipt of the synchronization acknowledgment from the participant communications device.

6. The method of claim 1, further comprising ignoring receipt of the synchronization acknowledgement, thus allowing the mobile participant communications device to request any object from the library of digital objects.

7. The method of claim 6, further comprising:
receiving a request to access a non-synchronized object from the mobile participant communications device, and
in response to the request, selecting the requested object from the library of digital objects stored in the intermediate host communications device and communicating the requested object to the mobile participant communications device.

8. The method of claim 1, wherein initializing the conference comprises:
accessing a list of at least one mobile participant communications device, the list identifying at least one communications path between the host communications device and the mobile participant communications device, the list further identifying a mobile communications profile of the mobile communications device, the mobile communications profile comprising at least one of presentation capabilities of the mobile communications device, communication preferences for communicating with the mobile communications device, a default memory device of the communications network, and a history of conference communications with the mobile communications device.

9. The method of claim 1, wherein initializing further comprises at least one of:
analyzing a communications path between the host communications device and the mobile participant communications device to identify at least one available memory device, determining a cost factor between the host communications device, the available memory device, and the mobile participant communications device and, using the cost factor to select the memory device from the at least one available memory device,
analyzing the communications path and determining a security factor between the host communications device, the available memory device, and the mobile participant communications device and, using the security factor to select the memory device from the at least one available memory device, and
analyzing the communications path and determining a reliability factor between the host communications device, the available memory device, and the mobile participant communications device and, using the reliability factor to select the memory device from the at least one available memory device.

10. The method of claim 1, further comprising retrieving presentation instructions for the object from the memory of the intermediate host communications device.

11. A system, comprising:
a processor executing code stored in memory, the code causing the processor to:
initialize a conference amongst a host communications device, an intermediate host communications device, and a remote, mobile participant communications device;
prior to the conference, communicate a library of digital objects from the host communications device to the intermediate host communications device;
during the conference, communicate a synchronization command from the host communications device to the intermediate host communications device that instructs the intermediate host communications device to retrieve an object from memory during the conference;
communicate the object from the intermediate host communications device to the mobile participant communications device during the conference;
force the host communications device to await receipt of a synchronization acknowledgement from the mobile participant communications device before advancing to another object in the library of digital objects, the synchronization acknowledgement thus confirming that the object was successfully presented on the mobile participant communications device; and
send a synchronization override command that allows the mobile participant communications device to progress through the library of objects and to select any object from the library of digital objects, such that the host communications device need not await receipt of the synchronization acknowledgment from the participant communications device.

12. The system of claim 11, wherein the code further causes the processor to receive at least one of (i) a command to exit the conference, (ii) a command to delay presentment of the conference, (iii) a synchronization override command to access to any object from the library of digital objects, (iv) authority to distribute the object to a non-participant, (v) authority to modify the object, (vi) a command to terminate further communication of a synchronization confirmation, and (vii) a command to modify a communication connection of the conference.

13. The system of claim 11, wherein the code further causes the processor to receive a synchronization acknowledgement from the mobile participant communications device that confirms a successful presentation of the object at the mobile participant communications device.

14. The system of claim 13, wherein the code further causes the processor to delay communication of a subsequent synchronization command until the synchronization acknowledgment is received from the mobile participant communications device.

15. A computer program product comprising a computer readable medium storing processor executable instructions, wherein when executed by the processor perform a method, the method comprising:
initializing the conference amongst a host communications device, an intermediate host communications device, and a remote, mobile participant communications device;
prior to the conference, communicating a library of digital objects from the host communications device to the intermediate host communications device;
during the conference, communicating a synchronization command from the host communications device to the intermediate host communications device that instructs the intermediate host communications device to retrieve an object from memory during the conference;
communicating the object from the intermediate host communications device to the mobile participant communications device during the conference;
forcing the host communications device to await receipt of a synchronization acknowledgement from the mobile participant communications device before advancing to another object in the library of digital objects, the synchronization acknowledgement thus confirming that the object was successfully presented on the mobile participant communications device;

analyzing a communications path between the host communications device and the mobile participant communications device to identify at least one available memory device;

determining a cost factor between the host communications device, the available memory device, and the mobile participant communications device; and using the cost factor to select the memory device from the at least one available memory device.

* * * * *